April 25, 1939.    W. F. HEROLD    2,155,828
CASTER
Filed Nov. 13, 1937
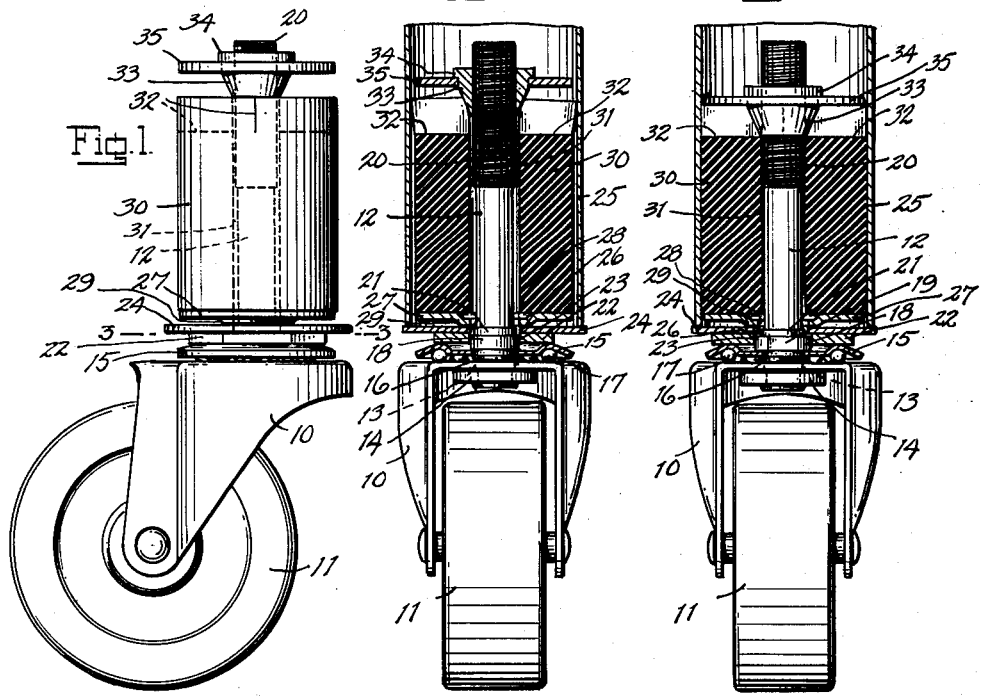
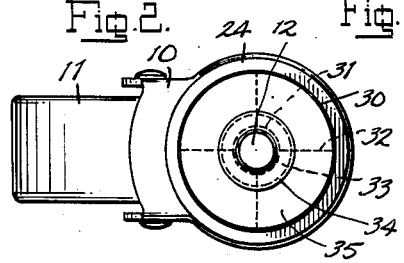
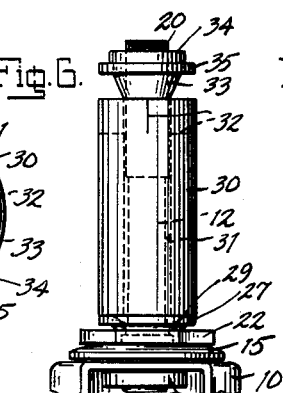
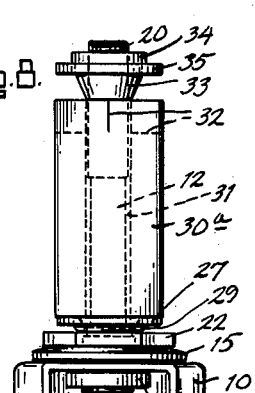
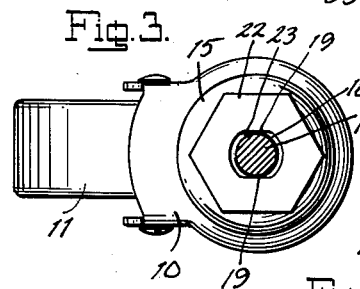
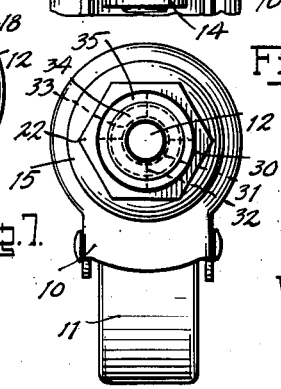
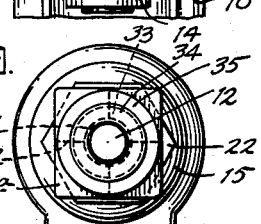
INVENTOR
WALTER F. HEROLD.
BY
ATTORNEY Patented Apr. 25, 1939

2,155,828

UNITED STATES PATENT OFFICE 2,155,828

CASTER

Walter F. Herold, Bridgeport, Conn., assignor to The Bassick Company, Bridgeport, Conn., a corporation of Connecticut Application November 13, 1937, Serial No. 174,436

6 Claims. (Cl. 16—38)

The present invention relates to improvements in casters, and is a continuation in part of the inventions disclosed in my patent applications for Casters, Ser. No. 97,904 filed August 26, 1936, and Ser. No. 132,426 filed March 22, 1937. The invention relates particularly to a caster for insertion in and attachment to tubular furniture legs, and in which there is provided an expanding attachment element consisting of an expanding rubber member which both retains the caster in relation to the leg and provides shock absorbing means for preventing transmission of shock to the furniture leg.

In casters of this type heretofore in use difficulty has been experienced in causing the rubber member to initially grip the interior of the leg, so that the rotatable parts for compressing and expanding the rubber element could be operated without rotation of the rubber element, and also there was no assurance that the bottom of the attaching means would be pulled into tight engagement with the lower end of the leg, due to the fact that initial lateral expansion of the rubber element took place simultaneously along the entire length of the rubber element, with the result that the rubber would grip the leg adjacent its lower end thus preventing the attaching means from being pulled upwardly with respect to the leg.

In my application Ser. No. 97,904 I have disclosed means whereby upon axial compression and lateral expansion of the rubber member a differential gripping action was produced so that its upper end initially gripped the interior of the leg and constituted an anchor which caused the lower end of the caster to be pulled upwardly during the continued compression. In my application Ser. No. 132,426 I have disclosed means for initially gripping the interior of the leg adjacent the upper end of the rubber element, and wedge means adapted to be drawn into the upper end of the rubber member to expand it during the initial movement, this upper end of the rubber element being in the form of a circumferentially continuous band.

It is an object of the present invention to provide a compression member including a wedge surface for engaging the bore of the rubber member at its upper end and further to provide such upper end in the form of a circumferential non-continuous band, which may be easily forced outwardly with respect to the rest of the rubber member. It is proposed in the exemplary illustrated embodiment to provide radial slits in the upper end portion of the rubber member forming a series of segments and whereby the wedge member upon engaging the upper end of the rubber element will simply force the segments outwardly to cause the same to frictionally grip the interior of the leg. This expansion of the upper end of the rubber element will require relatively little force, and will permit the rubber member to be substantially less in diameter than the interior of the leg, while enabling the person inserting the caster to first expand the upper end by an easy manual turning of the compressing means, so that the upper end is approximately the size of the interior of the leg and may be easily slipped into place.

Another object is to provide a structure in which the same compression parts may be conveniently employed with different diameter rubber members, thus permitting of the economical manufacture of a wide range of sizes.

A further object is to provide compression means for engaging the lower end of the rubber element which will engage within the lower end of the leg with its outer periphery spaced upwardly from the lower edge of the leg so that the possibility of disengagement of said compression means through slight tilting of the leg relative to the caster will be prevented. It is a further object to provide such compression means having an annular bearing projection, which will space its outer periphery upwardly within the leg and will also provide an anti-friction surface to enable the rotatable pressure applying means of the caster to be rotated relatively to the rubber element with a minimum amount of resistance.

With the above and other objects in view, embodiments of the invention are shown in the accompanying drawing, and these embodiments will be hereinafter more fully described with reference thereto and the invention will be finally pointed out in the claims.

In the drawing:

Fig. 1 is a side elevation of a caster according to an exemplary illustrated embodiment of the invention.

Fig. 2 is a top plan view.

Fig. 3 is a horizontal sectional view taken along the line 3—3 of Fig. 1.

Fig. 4 is a vertical sectional view showing the caster inserted in the tubular furniture leg, and with the upper part of the rubber element outwardly displaced into gripping relation with the interior of the leg.

Fig. 5 is a vertical sectional view similar to Fig. 4, but with the leg turned 90° from the position shown in Fig. 4, and showing the rubber sleeve completely expanded to grip the tubular leg.

Fig. 6 is a side elevation, partially broken away, of a modified form of the invention for attachment to a smaller diameter cylindrical tubular leg than that shown in Figs. 1 to 5.

Fig. 7 is a top plan view thereof.

Fig. 8 is a side elevation, partially broken away, of a further modification for attachment to a square tubular leg.

Fig. 9 is a top plan view thereof.

Similar reference characters indicate corresponding parts throughout the several figures of the drawing.

Referring to the drawing, and more particularly to Figs. 1 to 5 thereof, the caster, according to the illustrated exemplary embodiment of the invention, comprises a caster horn 10 carrying a caster wheel 11, the horn being rotatably mounted upon a vertically disposed stem 12 extending through a central aperture 13 in the horn top and retained by a riveted washer 14, an annularly grooved bearing plate 15 being secured upon the lower end of the stem by swedging, as at 16, between which plate and the horn top there are provided ball bearings 17. The stem is provided near its lower end above the bearing plate 15 with an enlarged diameter portion 18 having oppositely disposed flats 19—19 thereon, and is provided at its upper end with a threaded portion 20. The stem 12 below the threaded portion 20 is smaller in diameter than the threaded portion, and immediately above the enlarged portion 18 there is provided a shoulder portion 21 substantially corresponding in diameter to the diameter of the threaded portion, but smaller in diameter than the enlarged portion 18. Upon the portion 18 there is mounted a hexagonal nut 22 having a non-circular aperture 23 corresponding in shape to the cross-section of the portion 18, so that the nut is fixed against rotation with relation to the stem, and upon being turned imparts rotation to the stem.

Above the nut 22 there is engaged upon the stem 12 a circular washer 24 of slightly larger diameter than the outside diameter of the tubular leg 25, to which the caster is to be attached, and which is adapted to engage the lower edge of the leg, this washer having a central circular aperture 26 rotatably engaged upon the shoulder portion 21 and which substantially centralizes the washer with respect to the stem.

Above the washer 24 there is engaged upon the stem the lower compression washer 27, of slightly smaller diameter than the inside diameter of the leg 25 so that it will engage freely within the leg, this washer having a central aperture 28 loosely engaged by the stem. An annular downwardly embossed spacing and bearing portion 29 surrounds the aperture 28 and bears upon the upper surface of the washer 24. It will be noted that this annular portion 29 provides a relatively small diameter anti-friction bearing surface which will enable the washer 24 to turn freely with respect to the washer 27 with the least amount of frictional resistance, and also spaces the outer periphery of the washer 27 upwardly from the lower edge of the tubular leg 25 so that in the event of slight tilting between the leg and the caster, such as might occur if there is unusually great impact against the caster there will be no chance of the washer 27 becoming disengaged from the interior of the leg and slipping beneath the lower edge, and such as might be the case if the outer peripheral edge of the washer 27 was in direct contact with the upper surface of the washer 24.

The rubber expansion sleeve 30 is of tubular cylindrical form and is engaged upon the stem 12 with its base resting upon the washer 24, being provided with a central cylindrical passage 31 engaged by the stem and which is slightly larger in diameter than the diameter of the threaded portion 21. The outside diameter of the rubber sleeve is preferably slightly larger than the diameter of the washer 27 although it may if desired be of equal diameter. The upper end portion of the sleeve is provided with a series of radial slits 32, so that this upper end portion while being integral and identical in resilience and hardness with the lower portion is circumferentially non-continuous, and may therefore be readily displaced outwardly simply by exerting outward pressure within the bore of the sleeve. While the rubber sleeve is therefore constructed of the same rubber throughout and is of equal interior and exterior diameter from top to bottom, its upper portion may nevertheless be expanded with much greater ease than the lower portion, the expansion in the upper portion taking place simply by lateral displacement of the segments while the expansion of the lower portion takes place by vertically applied compression. Upon the upper threaded end 20 of the stem 12 there is engaged a conical expander 33 normally disposed above the upper end of the rubber sleeve in the detached position of the caster as shown in Fig. 4. This expander is provided at its upper end with a shoulder 34, and an upper compression plate 35 is forced upon the expander beneath this shoulder. This upper compression plate 35 is adapted to engage the upper end of the sleeve in the compressed relation, presently to be more fully described, and its outer diameter is preferably slightly less than the outer diameter of the sleeve, although it may if desired be of the same diameter.

The operation is as follows:

As shown in Fig. 1 the parts are in their normal relation before insertion in the tubular leg. It will be noted from Fig. 4 that the outside diameter of the tubular rubber sleeve is substantially less than the inside diameter of the leg, and in order to cause the sleeve to grip the leg preparatory to compressing the sleeve the expander 33 is turned down upon the threaded portion 20 for a short distance to partially engage it within the upper radially slit portion of the sleeve, so that this portion is outwardly displaced just sufficiently to enable it to be inserted into the tubular leg. Ordinarily the friction thus provided is sufficient to hold the sleeve against rotation as the nut 18 and stem 12 are turned to cause the expander to move downwardly upon the threaded portion 20, and the friction between the expander 33 and the rubber sleeve is sufficient to hold the expander against relative rotation. If this is not sufficient a slight tilting of the rubber to bring one side against the inner surface of the leg will serve to hold it against rotation until the expander is drawn down sufficiently within the rubber sleeve to cause it to positively grip the leg. The initial downward movement of the expander which causes the conical portion to enter fully the upper radially slit portion of the sleeve will cause this upper portion to tightly grip the interior of the tubular leg, and as the resistance of this portion to the entering action of the expander is reduced by the fact that it is not circumferentially continuous this initial action may be performed with comparative ease. The downward movement of the expander is then continued by continued turning of the nut 18 and stem 12, which may be done with a suitable spanner wrench, and causes the sleeve to be completely expanded into tight engagement with the interior of the leg as shown in Fig. 5. During this action the upper portion will first act as an anchor grip, and if there is any looseness or space between the lower end of the leg and the washer 24, the washer will be drawn upwardly into tight engagement with the leg, due to the fact that the expander 33 and compression washer 35 are in effect held against movement as the stem 12 moves upwardly as it is rotated.

In Fig. 6 I have shown a modification of the invention adapted for insertion in a tubular leg of smaller diameter than that shown in Figs. 4 and 5. The same compression means for the rubber sleeve are employed as in the first embodiment, except that the lower and upper compression washers 29 and 35 are smaller in diameter than the washers 29 and 35 of the first embodiment and are slightly less in diameter than the rubber sleeve member 30. The expander 33 is the same part as employed in the first embodiment the different diameter washer 35 simply being forced upon this part. The same stem 12 and nut 22 are employed, and in the case of the leg being of smaller diameter than the diameter of this nut the washer 24, as employed in the first embodiment is dispensed with, the leg engaging directly against the nut 22. The structure and operation are otherwise the same as described with reference to the first embodiment.

In Fig. 8 I have shown a further modification in which the rubber expander sleeve 30ª is of square cross-sectional form and is adapted to be inserted within a square tubular leg, the other parts being exactly the same as described with reference to the other embodiments. As shown in Fig. 9 the upper compression washer 35 is circular and is of such diameter as to come within the periphery of the rubber sleeve. The lower compression washer 27 is also circular.

I have illustrated and described preferred and satisfactory embodiment of the invention, but it will be understood that changes may be made therein within the spirit and scope thereof as defined in the appended claims.

Having thus described my invention what I claim and desire to secure by Letters Patent is:—

1. In a furniture support for insertion in a tubular leg, a floor engaging element, a vertical stem connected thereto, an expansion sleeve laterally expansible upon axial compression surrounding said stem and having upper and lower end surfaces, and including a circumferentially non-continuous portion at its upper end, means on said stem engaging the upper and lower end surfaces of said sleeve for axially compressing said sleeve whereby said sleeve is laterally expanded, said means including an expander element surrounding said stem having means adapted to enter the bore of said sleeve at said upper end whereby said circumferentially non-continuous portion of said sleeve is initially laterally displaced, continued movement of said expander in its entering direction adapted to laterally expand said sleeve between its ends.

2. In a furniture support for insertion in a tubular leg, a floor engaging element, a vertical stem connected thereto, an expansion sleeve of rubber surrounding said stem and including a circumferentially non-continuous portion at its upper end and a circumferentially continuous portion below said upper end portion, means on said stem for axially compressing said sleeve whereby said sleeve is laterally expanded, said means including an expander element surrounding said stem having means adapted to enter the bore of said sleeve at said upper end whereby said circumferentially non-continuous portion of said sleeve is initially laterally displaced, continued movement of said expander in its entering direction adapted to laterally expand said sleeve between its ends.

3. In a furniture support for insertion in a tubular leg, a floor engaging element, a vertical stem connected thereto, an expansion sleeve laterally expansible upon axial compression surrounding said stem and having upper and lower end surfaces, its upper end portion having a series of equally spaced radial slits providing a circumferentially non-continuous portion at its upper end, means on said stem engaging the upper and lower end surfaces of said sleeve for axially compressing said sleeve whereby said sleeve is laterally expanded, said means including an expander element surrounding said stem having means adapted to enter the bore of said sleeve at said upper end whereby said circumferentially non-continuous portion of said sleeve is initially laterally displaced, continued movement of said expander in its entering direction adapted to laterally expand said sleeve between its ends.

4. In a furniture support for insertion in a tubular leg, a floor engaging element, a vertical stem connected thereto, an expansion sleeve of rubber surrounding said stem and including a circumferentially non-continuous portion at its upper end, and a circumferentially continuous portion below said upper end portion, said sleeve being of equal cross-sectional area from top to bottom means on said stem for axially compressing said sleeve whereby said sleeve is laterally expanded, said means including an expander element surrounding said stem having means adapted to enter the bore of said sleeve at said upper end whereby said circumferentially non-continuous portion of said sleeve is initially laterally displaced, continued movement of said expander in its entering direction adapted to laterally expand said sleeve between its ends.

5. In a furniture support for insertion in a tubular leg, a floor engaging element, a vertical stem connected thereto, an expansion sleeve laterally expansible upon axial compression surrounding said stem and having upper and lower end surfaces and including a circumferentially non-continuous portion at its upper end, means on said stem engaging the upper and lower end surfaces of said sleeve for axially compressing said sleeve whereby said sleeve is laterally expanded, said means including an expander element surrounding said stem having a wedge surface adapted to enter the bore of said sleeve at said upper end whereby said circumferentially non-continuous portion of said sleeve is initially laterally displaced and a laterally extending washer carried by said expander element adapted upon continued movement of said expander in its entering direction to engage the upper end of said sleeve to laterally expand said sleeve between its ends.

6. In a furniture support for insertion in a tubular leg, a floor engaging element, a vertical stem connected thereto, an expansion sleeve laterally expansible upon axial compression surrounding said stem and having upper and lower end surfaces, means on said stem engaging the upper and lower end surfaces of said sleeve for axially compressing said sleeve whereby said sleeve is laterally expanded, a nut secured to the lower end portion of said stem below said sleeve for rotating said stem, and a compression washer between said nut and said sleeve adapted to engage within said tubular leg having a downwardly projecting annular portion inwardly of its outer periphery whereby said outer periphery is upwardly spaced from the lower end of said leg.

WALTER F. HEROLD.